United States Patent [19]

Marks

[11] Patent Number: 4,627,087
[45] Date of Patent: Dec. 2, 1986

[54] 3-DIMENSIONAL DISPLAY OF X-RAY, CAT SCAN AND NMR IMAGES

[76] Inventor: Alvin M. Marks, c/o ARDI, 359 R Main St., Athol, Mass. 01331

[21] Appl. No.: 470,432

[22] Filed: Feb. 28, 1983

[51] Int. Cl.[4] ............................................ G03B 41/16
[52] U.S. Cl. ........................................ 378/4; 378/20; 378/41
[58] Field of Search ............... 378/41, 42, 20, 19, 378/4; 40/361; 350/133, 137, 138, 141, 143

[56] References Cited

U.S. PATENT DOCUMENTS

| 583,956 | 6/1897 | Thomson | 378/41 |
| 2,046,543 | 7/1936 | Boldingh | 378/41 |
| 2,459,528 | 1/1949 | Hook | 378/41 |
| 2,468,963 | 5/1949 | Dudley | 378/41 |
| 3,039,358 | 6/1962 | Vierling | 350/133 |
| 3,076,054 | 1/1963 | Simon | 378/41 |
| 4,174,481 | 11/1979 | Liebetruth | 378/99 |

Primary Examiner—Craig E. Church

[57] ABSTRACT

This invention describes method and apparatus for taking and displaying 3-dimensional images derived from X-ray, CAT scan or NMR data; in which pairs of images are derived from objects whose axes are arranged plus or minus the angle $\alpha$ to the Z axis of the device, $\alpha$ being a small angle, such as 5° and various apparatus is shown for viewing the 3-dimensional stereo pairs thus derived to produce a spatial view of a given body volume.

5 Claims, 5 Drawing Figures

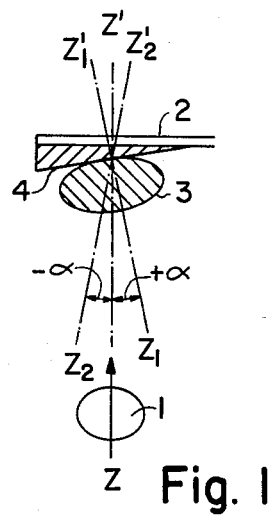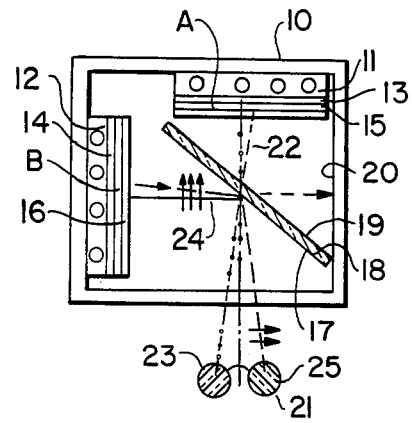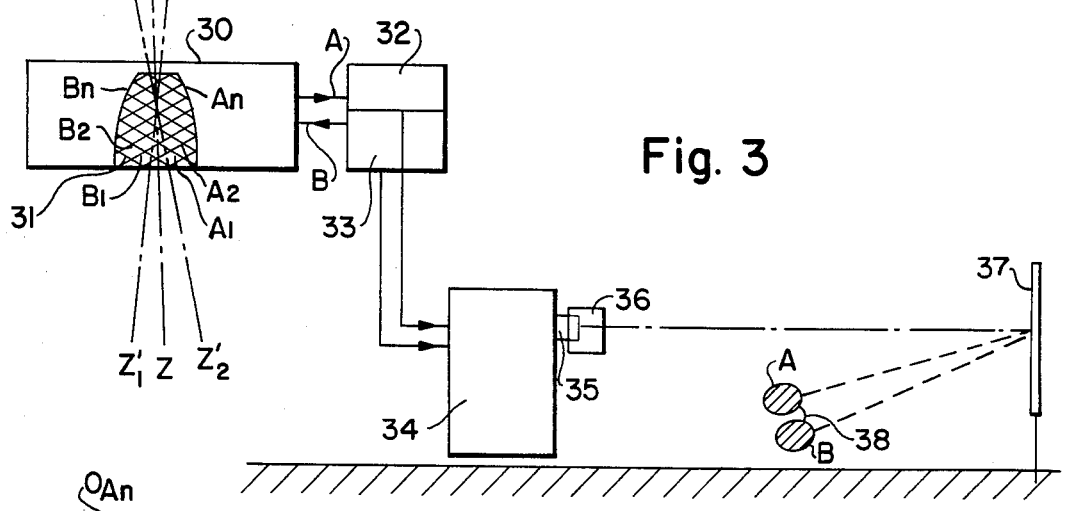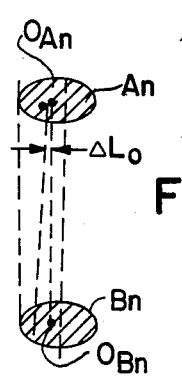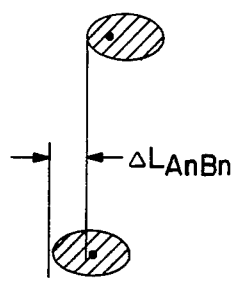

3-DIMENSIONAL DISPLAY OF X-RAY, CAT SCAN AND NMR IMAGES

BACKGROUND OF THE INVENTION

This invention relates to the display of 3-dimensional images derived from X-ray, CAT scan or NMR image data.

The interpretation of flat X-ray photographs has been difficult because the X-ray image is a shadow showing different densities of tissue and bone. The present invention facilitates the interpretation of X-ray images by providing a 3D image of the object viewed. While the images are still shadowgraphs, these shadowgraphs are presented as 3-dimensional images which greatly facilitates their understanding and interpretation.

IN THE FIGURES

FIG. 1 shows a section of an X-ray device adapted to take stereo X-ray images of a body section.

FIG. 2 shows a plan view of an optical device for viewing 3-dimensional X-rays.

FIG. 3 shows a diagram of a system for 3-dimensional viewing of CAT scan or NMR images.

FIG. 4 shows aligned pairs of stereo images showing displacement of portions thereof, resulting from the stereo imaging procedure.

FIG. 5 shows displacement of the whole stereo image pairs which gives rise to the various depths of the image pairs being displayed.

FIG. 1 shows a plan sectional view of an X-ray device including the body section being X-rayed. The method employed is to tilt the body by pressing it against an inclined plane so that the X-ray beam proceeds through the body at a small angle $-\alpha$; for example, 4°-6° to the axis of the X-ray beam. Two pictures are taken; one with the inclined plane to tilt the body at the angle $+\alpha$ and the second to tilt the body through the angle $-\alpha$. This can readily be done by taking two photographs with the body pressed against the inclined plane the first case and then reversing the inclined plane and thereafter taking a second picture.

In FIG. 1, 1 is a source of X-rays which pass along the ray axis Z Z'. A film recording the X-rays is usually placed normal to the X-ray axis as shown at 2. The body being X-rayed is shown as the oval 3. An inclined plane or wedge 4 is placed against the surface of the X-ray plate 2. In photographing image A, the body is placed as shown against the inclined plane 3 so that the body axis $Z_1 Z_1'$ makes an angle $+\alpha$ with the Z Z' axis. Similarly, to take the picture B, the inclined plane or wedge 4 is reversed and the body 3 is shifted so that its axis now makes an angle $Z_2 Z_2'$, which is $-\alpha$ to the axis Z Z'.

FIG. 2 shows a plan sectional view through a viewing device for visualizing the X-ray pairs in 3 dimensions. The device comprises a box frame 10 with light boxes 11 and 12 which produces a uniform illumination on "frosted" glass screens 13 and 14, respectively. In front of the uniformly illuminated frosted glass screens 13 and 14, X-ray images A and B, and in front of the X-ray images A and B, polarizing filters 15 and 16 are permanently positioned; the polarizing axis of 15 being vertical and the polarizing axis of 16 being horizontal. The polarizing axis of the light is defined parallel to its electric vector.

A half silvered mirror or multilayer polarizing beam splitter 17 is placed on one surface of the glass sheet 18, the other surface having a non-reflecting coating 19. The interior surface of the box 10 is coated with a black light-absorbing coating 20. Polarizing viewers 21 are provided for the observer, not shown.

In operation, the light rays 22 pass through the X-ray image A, are polarized by polarizing element 15 and then pass through the glass plate 18, a small portion being reflected and absorbed on coating 20. Rays 22 eventually reach the left eye polarized lens 23 of the polarized viewer 21. The left lens 23 is also polarized vertically and transmits the rays 22 allowing the left eye to see the image A. In a similar manner, light rays pass through film B, are polarized by polarizing element 16 in a horizontal plane at 24, and thereafter reflected by the coating 17 to the right eye lens 25 which is polarized horizontally. Thus the left eye sees only the image on film A and the right eye sees the image only on film B. Since the images A and B were taken with the device shown in FIG. 1, portions of the images are displaced in accordance with their depth along the axis of the X-ray beam, and the observer sees an X-ray image with the portions thereof arranged in depth.

FIG. 3 shows a complete assembly of a CAT scan or NMR scan device in conjunction with an image processor and a 3-dimensional projector to image a body volume in 3D upon a metallized screen, the body volume appearing as a transparent or semi-transparent image in which portions thereof (organs, bones, etc.) are displayed spatially. The various portions of the image appear as spatial volumes of different density, with or without added color. In carrying out the invention, a conventional CAT scan or NMR device 30 is positioned around the body volume 31. The body volume is advanced by incremental distances to provide slices of the body in the usual way. The normal axis of the CAT scan or NMR device 30 is Z Z'. The body is first fed incrementally by distance $\Delta Z_1'$ along the axis $Z_1 Z_1'$ at an angle of $\alpha$, which produces body sections $A_1 A_2 \ldots A_n \ldots k$. In a similar manner, the body is returned to its starting position and fed incrementally by distances $\Delta Z_2'$ along the axis $Z_2 Z_2'$ which is at an angle $-\alpha$ to the Z Z' axis, thus producing the image slices $B_1 B_2 \ldots B_n \ldots k$. These images are fed to storage devices 32 and 33 respectively. Storage device 32 stores the A image slices and storage device 33 stores the B image slices. Storage devices 32 and 33 may be any suitable device, such as computer storage elements, TV tape, photographic film and the like. The images from 32 and 33 are fed to a projection type TV projector 34, which preferably has a single projection lens 35 on which an optical projector device 36 is attached. The image projector may be for example, A G. E. type large screen projector and the optical projector device is similar to that employed in theatres known as POLARATORS ™ and described in U.S. Pat. No. 3,851,955. The images A and B appear one above the other, but when projected onto metallized screen 37 are overlapped and polarized thereon and when viewed with the polarized viewers 38, the left eye sees the image A and the right eye sees the image B. Because of the manner in which the slices are made as hereinabove described, a portion of the image $O_{An}$ is displaced relative to its corresponding point $O_{Bn}$ when the edges of the images are aligned as shown in FIG. 4. The depth of the images is controlled by the relative displacement of the whole image indicated as $\Delta L_{AnBn}$ as shown in FIG. 5. In viewing the entire image, the succession of images $A_n$ and the succession of corresponding images $B_n$ are presented simultaneously, but in rapid succession so that n takes on values from 1 to k where $1 < n < k$, such that the entire group of images is perceived as a single spatial image, and the body volume being displayed appears to exist spatially.

Various modification may be made herein without departing from the scope of the invention.

Having thus fully described the invention, what I claim is:

1. A method for the display of X-ray CAT scan images of a body volume as a three dimensional spatial image comprising imaging said body volume as a plurality of incremental sections as A and B stereo image pairs, storing said image pairs in a storage device, retrieving said A and B stereo image pairs from said storage device in rapid succession, projecting, overlapping and orthogonally polarizing said stereo image pairs onto a screen, and viewing said images through orthogonally polarized viewers.

2. A method for the display of NMR CAT scan images of a body volume as a three dimensional spatial image comprising imaging a body volume as a plurality of incremental sections as A and B stereo pairs taken along two axes $Z_1Z_1'$ and $Z_2Z_2'$, respectively making two angles $+\alpha$ and $-\alpha$ to the central NMR CAT scan axis $ZZ'$, storing said A and B image pairs in a storage device, retrieving said stereo image pairs from said storage device in rapid succession, projecting, overlapping and orthogonally polarizing said stereo image pairs onto a screen, and viewing said images through orthogonally polarized viewers.

3. A system for the three dimensional display of X-ray CAT scan images of a body volume as spatial image of said body volume comprising an X-ray CAT scan instrument having a $ZZ'$ central axis, a table within said instrument to carry a body volume, means for feeding said table incremental distances $\Delta Z_1$ along a $Z_1Z_1'$ axis at $+\alpha$ to the $ZZ'$ axis, and also at incremental distance $\Delta Z_2$ along a $Z_2Z_2'$ axis at $-\alpha$ to the $ZZ'$ axis, A and B storage devices, said increments along the $Z_1Z_1'$ axis causing a series of image slices A to be stored in the said A storage device, and said increments along the $Z_2Z_2'$ axis causing a series of image slices A and B to be stored in said A and B storage device, means for retrieving said A images and said B images, and means for optically viewing and separating said A and B images into right and left eye images at an observer's eye.

4. A system for the three dimensional display of X-ray CAT scan images of a body volume as spatial image of said body volume comprising an X-ray CAT scan instrument having a $ZZ'$ central axis, a table within said instrument to carry a body volume, means for feeding said table incremental distances $\Delta Z_1$ along a $Z_1Z_1'$ axis at $+\alpha$ to the $ZZ'$ axis, and also at incremental distance $\Delta Z_2$ along a $Z_2Z_2'$ axis at $-\alpha$ to the $ZZ'$ axis, A and B storage devices, said increments along the $Z_1Z_1'$ axis, causing a series of image slices A to be stored in the said A storage device, and said increments along the $Z_2Z_2'$ axis causing a series of image slices B to be stored in said B storage device, means for retrieving said A images and said B images, a 3D-TV projection device, a metallized reflecting screen, means for simultaneously projecting, overlapping and polarizing said A and B images onto said screen, said A and B images being simultaneously displayed by said projector in rapid succession, and means for optically viewing and separating said A and B images into right and left eye images at an observer's eye.

5. A system for the three dimensional display of NMR CAT scan images of a body volume comprising an NMR CAT scan instrument having a $ZZ'$ central axis, a table within said instrument to carry a body volume, means for feeding said table incremental distances $\Delta Z_1$ along a $Z_1Z_1'$ axis at $+\alpha$ to the $ZZ'$ axis, and also at incremental distance $\Delta Z_2$ along a $Z_2Z_2'$ axis at $-\alpha$ to the $ZZ'$ axis, A and B storage devices, said increments along the $Z_1Z_1'$ axis causing a series of image slices A to be stored in the said A storage device, and said increments along the $Z_2Z_2'$ axis causing a series of image slices B to be stored in said B storage device, means for retrieving said A and B images, a 3D-TV projection device, a metallized reflecting screen, means for simultaneously projecting, overlapping and polarizing said A and B images onto said screen, said A and B images being simultaneously displayed by said projector in rapid succession, means for optically viewing and separating said A and B images into right and left eye images at an observer's eye, whereby the totality of said A and B images appear in three dimensions as spatial image of said body volume.

* * * * *